United States Patent
Dong et al.

(10) Patent No.: US 9,684,872 B2
(45) Date of Patent: Jun. 20, 2017

(54) METHOD AND APPARATUS FOR GENERATING DATA IN A MISSING SEGMENT OF A TIME DATA SEQUENCE

(71) Applicant: International Business Machines Corporation, Armonk, NY (US)

(72) Inventors: Wei S. Dong, Beijing (CN); Wen Q. Huang, Beijing (CN); Chang S. Li, Beijing (CN); Yu Wang, Beijing (CN); Junchi Yan, Shanghai (CN); Chao Zhang, Beijing (CN); Xin Zhang, Beijing (CN); Xiu F. Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/730,296

(22) Filed: Jun. 4, 2015

(65) Prior Publication Data

US 2015/0379410 A1 Dec. 31, 2015

(30) Foreign Application Priority Data

Jun. 25, 2014 (CN) .......................... 2014 1 0291275

(51) Int. Cl.
   *G06F 17/00* (2006.01)
   *G06N 7/00* (2006.01)
(52) U.S. Cl.
   CPC ...................................... *G06N 7/00* (2013.01)
(58) Field of Classification Search
   None
   See application file for complete search history.

(56) References Cited

U.S. PATENT DOCUMENTS

| 6,928,398 | B1 | 8/2005 | Fang et al. |
| 7,809,781 | B1 | 10/2010 | Shan |
| 8,200,454 | B2 | 6/2012 | Dorneich et al. |
| 2004/0181405 | A1* | 9/2004 | Shlomot ............... G10L 19/005 704/241 |
| 2006/0193671 | A1* | 8/2006 | Yoshizawa ............ G10L 19/005 400/208 |

(Continued)

FOREIGN PATENT DOCUMENTS

| EP | 2680158 A2 | 1/2014 |
| KR | 101271694 B1 | 5/2013 |

OTHER PUBLICATIONS

Kalra et al. "A new Auto Regressive (AR) model-based algorithm for Motion Picture Restoration", ICASSP, 1997, vol. 4, pp. 2557-2560.*

(Continued)

*Primary Examiner* — Li-Wu Chang
(74) *Attorney, Agent, or Firm* — L. Jeffrey Kelly

(57) ABSTRACT

A method and an apparatus for generating data in a missing segment of a target time data sequence are disclosed. The method includes: determining whether there is a breakpoint in the missing segment; determining candidate values of the data in the missing segment; and generating values of the data in the missing segment by selectively using the candidate values of the data in the missing segment, according to whether there is the breakpoint in the missing segment. With the method and the apparatus, the data in the missing segment of the target time data sequence can be generated more accurately.

11 Claims, 3 Drawing Sheets

(56) References Cited

U.S. PATENT DOCUMENTS

2013/0046721 A1     2/2013   Jiang et al.
2014/0032506 A1     1/2014   Hoey et al.

OTHER PUBLICATIONS

James et al., "Ecp: An R Package for Nonparametric Multiple Change Point Analysis of Multivariate Data", Cornell University, 2013, pp. 1-31.
Lung-Yut-Fong et al, "Robust Changepoint Detection Based on Multivariate Rank Statistics", Institut Telecom & CNRS, LTCI, Telecom Paris Tech, 2011, pp. 1-4.
Translation of Pending CN Application No. 201410291275.5, filed Jun. 25, 2014, entitled "Method and Apparatus for Generating Data in a Missising Segment of a Time Data Sequence", 27 pages.
Sridevi et al., "Imputation for the Analysis of Missing Values and Prediction of Time Series Data", 2011 IEEE, pp. 1158-1163.

\* cited by examiner

METHOD AND APPARATUS FOR GENERATING DATA IN A MISSING SEGMENT OF A TIME DATA SEQUENCE

BACKGROUND

The present disclosure relates to reconstruction of missing data in a time data sequence, and more specifically, to a method and an apparatus for generating data in a missing segment of a time data sequence.

In various situations, data may be generated constantly over time by some data generation mechanism, thereby forming a time data sequence. For example, in a city, electricity meter readings of a user are read on a regular basis (e.g., monthly) to charge electricity fare, and these electricity meter readings can form a time data sequence. For some reason, a segment (including one or more data) in the time data sequence may be missing. For example, if the user has been out for two months, his electricity meter readings for the two months may not be read, so that a corresponding segment (which includes two data) in the time data sequence indicating the user's electricity meter readings of respective months is missing, which renders that when the time data sequence is analyzed to obtain some information (such as a case where the user steals electricity), an accurate analysis result cannot be obtained. Therefore, when there is a missing segment in a time data sequence, it is necessary to reconstruct/generate the missing segment (i.e., data therein).

Some methods for generating data in a missing segment of a time data sequence have been proposed. For example, in one method, the data in the missing segment are calculated through linear interpolation based on data on both sides of the missing segment in the time data sequence. In another method, the data in the missing segment is set to an average value of the data on both sides of the missing segment. However, in a case where the missing segment includes more than two data, the data in the missing segment generated by these methods often do not conform to an actual condition of the time data sequence, and thus are not accurate.

SUMMARY

An object of the present disclosure is to provide a method and an apparatus for generating data in a missing segment of a time data sequence (hereinafter, referred to as target time data sequence for convenience of description), which can determine the data in the missing segment more accurately.

According to an aspect of the present disclosure, there is provided a method for generating data in a missing segment of a target time data sequence, including: determining whether there is a breakpoint in the missing segment; determining candidate values of the data in the missing segment; and generating values of the data in the missing segment by selectively using the candidate values of the data in the missing segment according to whether there is the breakpoint in the missing segment.

According to another aspect of the present disclosure, there is provided an apparatus for generating data in a missing segment of a target time data sequence, including: a breakpoint determination device, configured to determine whether there is a breakpoint in the missing segment; a candidate value determination device, configured to determine candidate values of the data in the missing segment; and a generation device, configured to generate values of the data in the missing segment by selectively using the candidate values of the data in the missing segment according to whether there is the breakpoint in the missing segment.

According to another aspect of the present disclosure, there is provided a computer program product for generating data in a missing segment of a target time data sequence, the computer program product including at least one computer readable non-transitory storage medium having computer readable program instructions thereon for execution by a processor, the computer readable program instructions including program instructions for: determining whether there is a breakpoint in the missing segment; determining candidate values of the data in the missing segment; and generating values of the data in the missing segment by selectively using the candidate values of the data in the missing segment, according to whether there is the breakpoint in the missing segment.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
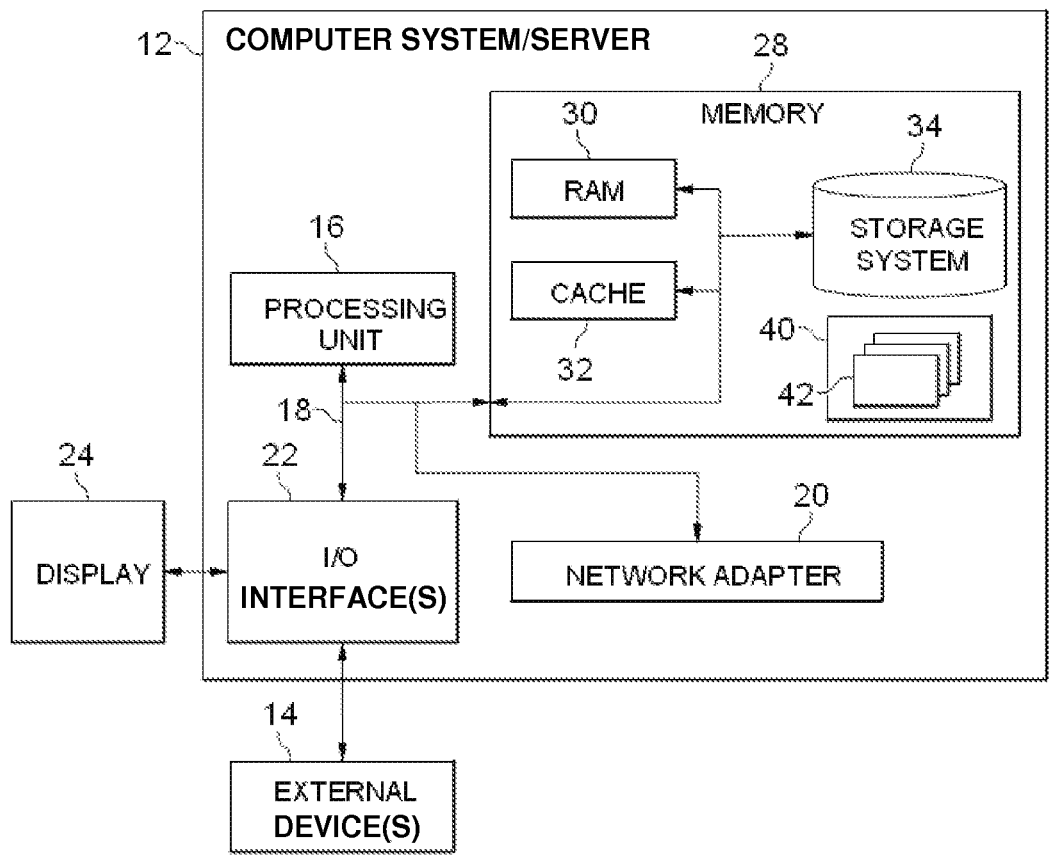
FIG. 1 shows a block diagram of an exemplary computer system/server, which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

With reference now to the accompanying drawings, a method and an apparatus for generating data in a missing segment of a target time data sequence according to embodiments of the present disclosure will be described below.

The target time data sequence may include a plurality of data, and each datum may correspond to one point. Hereinafter, "data/datum" and "point" can be used interchangeably. Further, for convenience of description, the target time data sequence may be expressed as $X=x_1, x_2, \ldots x_{n1}, x_{n1+1}, \ldots x_{n1+t}, x_{n1+t+1}, \ldots, x_n$, where n (n>2) represents an amount of data included in the target time data sequence, and the missing segment in the target time data sequence may be expressed as $X_{missing}=x_{n1+1}, \ldots, x_{n1+t-1}, x_{n1+t}$, i.e., the missing segment includes t (1<t<n−1) data. Accordingly, data $x_1, x_2, \ldots, x_{n1}$ before the missing segment may form a first subsequence X1, and data $x_{n1+t+1}, \ldots, x_n$ after the missing segment may form a second subsequence X2.

Figure 2:
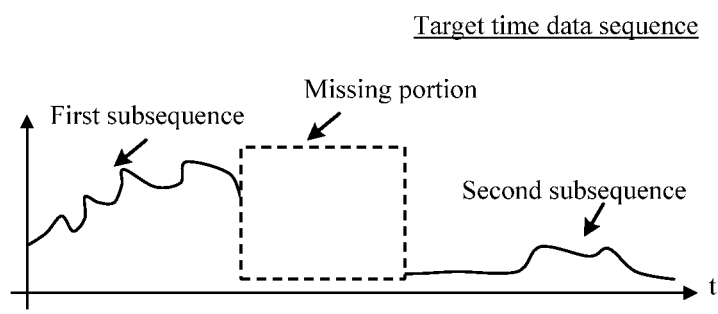
FIG. 2 illustrates a schematic diagram of a time data sequence having a missing segment.

FIG. 2 schematically illustrates a diagram of a time data sequence having a missing segment. In FIG. 2, a portion within a dashed box corresponds to the missing segment. It is to be noted that in FIG. 2, the target time data sequence is shown as a continuous line for simplicity, but in many cases, the target time data sequence corresponds to a plurality of discrete points.

Hereinafter, the method for generating data in the missing segment of the target time data sequence according to an embodiment of the present disclosure will be described with reference to FIG. 3.

Figure 3:
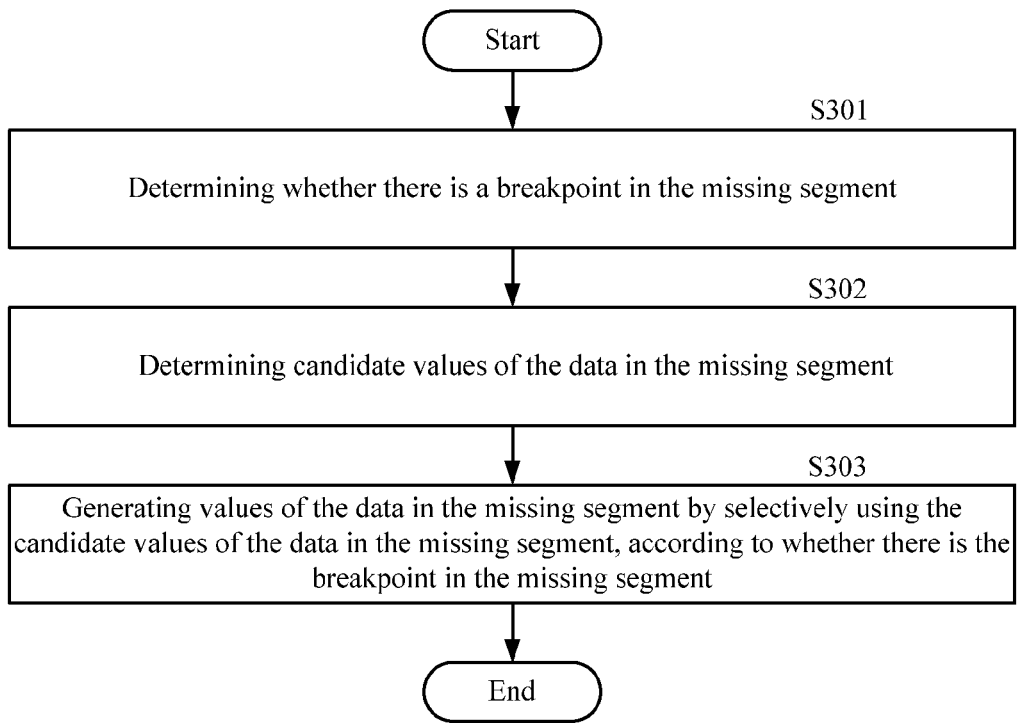
FIG. 3 illustrates a flowchart of generating data in a missing segment of a target time data sequence according to an embodiment of the present disclosure.

As shown in FIG. 3, in step S301, it is determined whether there is a breakpoint in the missing segment of the target time data sequence. As known in the art, the breakpoint may be datum deviating from other data in the target time data sequence relatively significantly.

In the embodiment of the present disclosure, the data in the missing segment of the target time data sequence are unknown, thus it is difficult to determine directly whether there is the breakpoint in the missing segment. To this end, it may be determined whether there is the breakpoint in the missing segment of the target time data sequence based on a reference time data sequence having a logical similarity to the target time data sequence, because if the two time data sequences have the logical similarity, data of the two time data sequences often have similarity too. The reference time data sequence having the logical similarity to the target time data sequence refers to a time data sequence having a logic attribute identical or similar to that of the target time data sequence. The logic attribute may depend on a nature of the target time data sequence. For example, if the target time data sequence represents electricity meter readings of a certain user in a certain period of time, the logic attribute may be the user's location, in which case the reference time data sequence having the logical similarity to the target time data sequence may be a time data sequence representing electricity meter readings of another user, who is located in a position (such as a building) identical or near to that of the user, in the period of time; or, the logic attribute may be the user's job, in which case the reference time data sequence having the logical similarity to the target time data sequence may be a time data sequence representing electricity meter readings of another user, who has a same job (and thus has a same working and resting schedule) as the user, in the period of time. To this end, various logic attributes of the target time data sequence and time data sequences which have logic attributes identical or similar to these logic attributes of the target time data sequence respectively may be stored in advance, so that the reference time data sequence having the logical similarity to the target time data sequence may be selected for subsequent use when necessary.

It may be determined whether there is the breakpoint in the missing segment by determining whether there is a breakpoint in a segment (i.e., reference segment), which corresponds to the missing segment of the target time data sequence, in the reference time data sequence. The reference segment may be, for example, a segment corresponding to a same period of time as the missing segment.

In the embodiment of the present disclosure, for each datum (i.e., reference datum) in the reference segment, it may be determined whether the reference datum corresponds to the breakpoint according to a difference degree between average values of predetermined amounts of data located on both sides of the reference datum respectively in the reference time data sequence. If the difference degree is relatively large, it can be determined that the reference datum is the breakpoint, thereby determining that the corresponding datum in the missing segment (e.g., datum corresponding to same time) is also the breakpoint. Conversely, if the difference degree is relatively small, it can be determined that the reference datum is not the breakpoint, thereby determining that the corresponding datum in the missing segment is not the breakpoint, either.

Specifically, it is assumed that the reference time data sequence is $Y = y_1, y_2, \ldots, y_{n1}, y_{n1+1}, \ldots, y_{n1+t}, y_{n1+t+1}, \ldots y_n$, where n (n>2) represents an amount of data included in the reference time data sequence, and the reference segment corresponding to the missing segment in the reference time data sequence is $Y_{ref} = y_{n1+1}, \ldots, y_{n1+t}$.

In an implementation, for each reference datum $y_j$ (n1+1≤j≤n1+t) in the reference segment, an average value $M_1$ of a predetermined amount of (k) data before the reference datum and an average value $M_2$ of a predetermined amount of (k) data after the reference datum may be calculated, then a difference $D_j$ between $M_2$ and $M_1$ is calculated, so as to measure the difference degree between the two average values through a magnitude of $D_j$:

$$D_j = |M_2 - M_1| = \left| \frac{1}{k} \sum_{l=j+1}^{j+k} x_l - \frac{1}{k} \sum_{l=j-k+1}^{j} x_l \right|.$$

Then all $D_j$ greater than a preset threshold may be identified, and corresponding reference data $y_j$ are determined as breakpoints in the reference segment, thereby determining corresponding data $x_j$ in the missing segment as the breakpoints in the missing segment. The predetermined amount k may be set flexibly as desired in a case of satisfying n1+t+k≤n and n1+1−k≥0. For example, k may be set to $n^s$, where s may be a positive number less than 1, such as 0.5 or 0.6. Furthermore, the threshold may be set flexibly as desired and/or according to the nature of the time data sequence itself. For example, when the reference time data sequence represents monthly electricity meter readings of a user, the threshold may be set to, for example, 10 if an average value of the monthly electricity meter readings of the user is 150 in a normal situation, so that when the difference between the average values is greater than 10, the corresponding reference datum is determined as the breakpoint. It is to be noted that, in the above manner, there may be a case where the differences $D_j$ corresponding to two or more continuous reference data in the reference segment exceed the threshold, and in such a case, the datum to which a maximum one of the differences $D_j$ corresponding to the two or more continuous reference data corresponds may be determined as the breakpoint, and the other data are not treated as the breakpoints.

In the above-described implementation, the difference degree between the two average values is measured according to the magnitude of the difference between the two average values, which however is not limitative. In another implementation, the difference degree between the two average values can also be measured by a ratio between the two average values, so that when the ratio is greater than a preset threshold, the corresponding reference datum is determined as the breakpoint. Or, the difference degree between the two average values may be measured in other manners. In other implementations, a degree of deviation of each reference datum from other reference data in the reference segment may also be determined in a manner other than calculating and comparing the average values, so as to determine whether the each reference datum is the breakpoint.

With further reference to FIG. 3, in step S302, candidate values of the data in the missing segment are determined.

Specifically, in the target time data sequence, although the data in the missing segment are missing, the data before the missing segment, i.e., the data in the first subsequence $(X1 = x_1, x_2, \ldots, x_{n1})$ described above, can reflect a certain data changing trend, and the data in the missing segment after the first subsequence may be determined according to the changing trend; in other words, first candidate values of the data in the missing segment can be determined based on the data on a first side of (e.g., before or on a left side of) the missing segment in the target time data sequence. Likewise, the data after the missing segment, i.e., the data in the second subsequence $(X2 = x_{n1+t+1}, \ldots, x_n)$ described above, can also reflect a certain data changing trend, and the data in the missing segment which are located before the second subsequence can be determined according to the data changing trend. In other words, second candidate values of the data in the missing segment can be determined based on the data on a second side of (e.g., after or on a right side of) the missing segment in the target time data sequence.

In the embodiment of the present disclosure, Autoregressive Integrated Moving Average (ARIMA) models may be fitted respectively with respect to the first subsequence and the second subsequence respectively, and in turn the first candidate values and the second candidate values can be determined according the ARIMA models. A method for fitting the ARIMA models with respect to the first subsequence and the second subsequence respectively is commonly known in the art, and thus is only described briefly hereinafter.

Specifically, the ARIMA($p_1$, $d_1$, $q_1$) model can be fitted with respect to the first subsequence, and the model includes three parameters, $d_1$, $p_1$ and $q_1$, where $d_1$ is an order of an differential operation performed on the first subsequence to make it become a stable sequence, $p_1$ is a number of autoregressive terms, and $q_1$ is a number of moving average terms. The ARIMA($p_1$, $d_1$, $q_1$) model can be determined by determining $d_1$, $p_1$ and $q_1$.

Firstly, the parameter $d_1$ can be determined Specifically, it can be tested whether the first subsequence is the stable sequence. As known in the art, the stable sequence refers to a sequence of which a joint probability distribution does not change with time; in other words, if the first subsequence is regarded as a random sequence, and a random feature of the first subsequence (reflected by the joint probability distribution) does not change with time, the first subsequence is the stable sequence, otherwise the first subsequence is an unstable sequence. In the embodiment of the present disclosure, it may be judged whether the first subsequence is the stable sequence by performing a unit root test on the first subsequence, i.e., testing whether there is a unit root in the first subsequence. A method for performing the unit root test on the first subsequence is commonly known in the art, and a description thereof is omitted here. If the first sequence is the stable sequence, it is unnecessary to perform the differential operation on it, so $d_1$ is 0. Conversely, if the first subsequence is not the stable sequence, a first-order differential operation may be performed on it, and it is tested whether the obtained first subsequence subject to the first-order differential operation is the stable sequence according to the method described above. If the first subsequence subject to the first-order differential operation is the stable sequence, $d_1$ can be determined as 1. Conversely, if the first subsequence subject to the first-order differential operation is still not the stable sequence, a second-order differential operation may be performed on the first subsequence, and it is tested whether the obtained first subsequence subject to the second-order differential operation is the stable sequence according to the method described above. If the first subsequence subject to the second-order differential operation is the stable sequence, $d_1$ may be determined as 2. Conversely, if the first subsequence subject to the second-order differential operation is not the stable sequence, a third-order differential operation may be performed on the first subsequence, and the testing operation described above may be repeated, until it is determined that the first subsequence subject to the differential operation is the stable sequence, and then $d_1$ is determined as a corresponding differential order.

Subsequently, $p_1$ and $q_1$ may be determined by the stable sequence obtained based on the first subsequence, i.e., the first subsequence per se or the first subsequence subject to $d_1$th-order differential operation. Initial values of $p_1$ and $q_1$ can be estimated by any method commonly known in the art, then a white noise test is performed on the ARIMA($p_1$, $d_1$, $q_1$) model obtained thereby, i.e., it is tested whether a residue between the stable sequence and the ARIMA($p_1$, $d_1$, $q_1$) model belongs to a white noise. If the residue belongs to the white noise, the ARIMA($p_1$, $d_1$, $q_1$) model passes the white noise test, i.e., the determined $p_1$ and $q_1$ are appropriate, and thus the ARIMA($p_1$, $d_1$, $q_1$) model may be fitted with respect to the first subsequence. Conversely, if the residual does not belong to the white noise, the ARIMA($p_1$, $d_1$, $q_1$) model does not pass the white noise test. In this case, the operations of estimating the parameters $p_1$ and $q_1$ and performing the white noise test on the ARIMA($p_1$, $d_1$, $q_1$) model determined thereby may be repeated, until appropriate parameters $p_1$ and $q_1$ are found so that the ARIMA($p_1$, $d_1$, $q_1$) model determined thereby passes the white noise test.

With the above operations, the ARIMA($p_1$, $d_1$, $q_1$) model corresponding to the first subsequence may be determined. Then, the first candidate values $x'_{n1+1}, \ldots, x'_{n1+t}$ of the data $x_{n1+1}, \ldots, x_{n1+t}$ in the missing segment located after the first subsequence may be calculated one by one by using the ARIMA($p_1$, $d_1$, $q_1$) model.

Similarly, the ARIMA($p_2$, $d_2$, $q_2$) model may be fitted with respect to the second subsequence $X2=x_{n1+t+1}, \ldots, x_n$. Unlike the first subsequence, the ARIMA($p_2$, $d_2$, $q_2$) model is not fitted directly based on the second subsequence, but is fitted based on a subsequence having a data order contrary to that of the second subsequence, that is, the ARIMA($p_2$, $d_2$, $q_2$) model is fitted in the above manner based on the subsequence $X2'=x_n, \ldots, x_{n1+t+1}$. Then, the second candidate values $x''_{n1+t}, \ldots, x''_{n1+1}$ of the data $x_{n1+t}, \ldots, x_{n1+1}$ in the missing segment can be determined one by one according to the ARIMA($p_2$, $d_2$, $q_2$) model.

Figure 4:
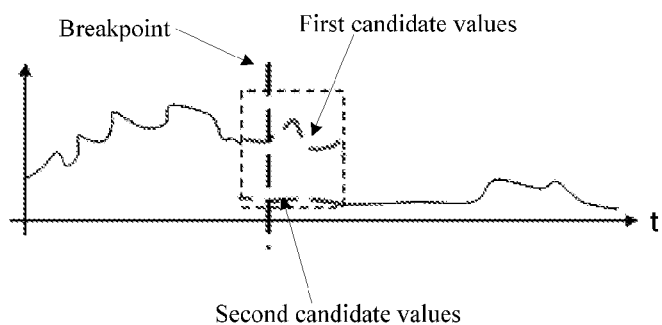
FIG. 4 illustrates a schematic diagram of a breakpoint and candidate values of data in a missing segment determined by using the method according to the embodiment of the present disclosure.

FIG. 4 illustrates a schematic diagram of the breakpoint and the first and second candidate values of the data in the missing segment determined by using the above method, with respect to the example shown in FIG. 2.

With further reference to FIG. 3, in step S303, values of the data in the missing segment are generated by selectively using the candidate values of the data in the missing segment according to whether there is the breakpoint in the missing segment.

Specifically, when the breakpoint does not exist in the missing segment, this means that there is no sudden change in the data in the missing segment, in which case the data in the missing segment may be generated by using both the first candidate values and the second candidate values of the data in the missing segment. In the embodiment of the present disclosure, the data in the missing segment may be generated by using weighted sums of the first candidate values and the second candidate values respectively. For example, for the datum $x_j$ in the missing segment, a weight $w_1$ of the first candidate value $x'_j$ and a weight $w_2$ of the second candidate value $x''_j$ ($w_1+w_2=1$) may be set as desired, and the value of the datum $x_j$ may be generated according to the following formula:

$$x_j = x'_j * w_1 + x''_j * w_2.$$

Figure 5:
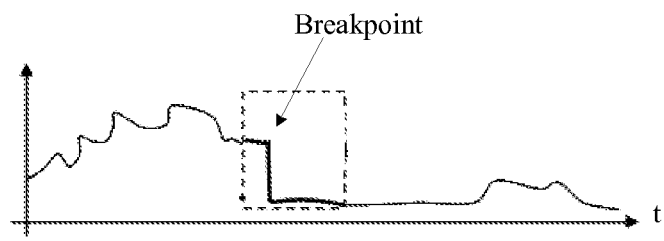
FIG. 5 illustrates a schematic diagram of generating values of data in a missing segment in a case where there is one breakpoint in the missing segment.

On the other hand, if there is one breakpoint in the missing segment, the values of the data in the missing segment can be determined as corresponding values in the first candidate values or corresponding values in the second candidate values, according to positions of the data in the missing segment relative to the breakpoint. For example, using the breakpoint in the missing segment as a boundary, the values of the data in the missing segment which are located on a first side (e.g., a left side) of the breakpoint may be determined as the corresponding values of the first candidate values, and the values of the data in the missing segment which are located on a second side (e.g., a right side) of the breakpoint may be determined as the corresponding values of the second candidate values. For example, for the data $x_{n1+1}, \ldots, x_{n1+t}$ in the missing segment, assume that $x_{n1+u}$ ($1 \leq u \leq t$) is determined as the breakpoint, then the data $x_{n1+1}, x_{n1+2}, \ldots, x_{n1+u}$ can be determined as $x'_{n1+1}, x'_{n1+2}, \ldots, x'_{n1+u}$ in the first candidate values, and the data $x_{n1+u+1}, \ldots, x_{n1+t}$ in the missing segment can be determined as $x''_{n1+u+1}, \ldots, x''_{n1+t}$ in the second candidate values. FIG. 5 illustrates a schematic diagram of generating the values of data in the missing segment in a case where there is one breakpoint in the missing segment.

If there are a plurality of breakpoints in the missing segment ($x_{n1+1}, \ldots x_{n1+t}$), the data in the missing segment, which are located between a first datum $x_{n1+1}$ and a first breakpoint (breakpoint which is closest to $x_{n1+1}$) in the missing segment may be generated in the manner described above, thereby the missing segment is updated into a new missing segment starting from the first breakpoint to $x_{n1+t}$, then the above method is performed repeatedly on the new missing segment, until all missing data have been generated.

In the above method according to the embodiment of the present disclosure, the breakpoint is determined according to the reference time data sequence having the logical similarity to the target time data sequence, the candidate values of the data in the missing segment are determined according to the data before and after the missing segment, and then the values of the data in the missing segment are generated according to the breakpoint and the candidate values. Thus, the generated data in the missing segment are more accurate than those generated by the conventional methods.

It is to be noted that the method described above is illustrative rather than limitative. For example, although it is described above that the step of determining the breakpoint is executed first, and then the step of determining the first and the second candidate values is executed, this is not limitative, and it is also possible to execute the step of determining the first and the second candidate values first and then execute the step of determining the breakpoint, or to execute the two steps simultaneously.

The embodiments for implementing the method of the present disclosure have been described above with reference to the accompanying drawings. Those skilled in the art may understand that the above method may be implemented in software, in hardware, or in a combination thereof. Further, those skilled in the art may understand that by implementing the respective steps in the above method in software, in hardware, or in a combination thereof, an apparatus for generating data in a missing segment of a target time data sequence based on the same inventive concept may be provided. Even if a hardware configuration of the apparatus is the same as that of a general-purpose processing apparatus, the apparatus will exhibit characteristics different from the general-purpose processing apparatus due to a function of software contained therein, so as to form the apparatus according to the embodiment of the present disclosure. The apparatus of the present disclosure includes a plurality of units or modules, which are configured to execute corresponding steps. Those skilled in the art may understand how to write a program to implement actions of the units or modules by reading the present specification.

Hereinafter, the apparatus for optimizing software according to the embodiment of the present disclosure will be described specifically with reference to FIG. 5. Because the apparatus and the method are based on the same inventive concept, the same or corresponding implementation details in the above method are also applicable to the apparatus corresponding to the above method, and these implementation details will not be described below because they have been described in the above in detail and completely.

Figure 6:
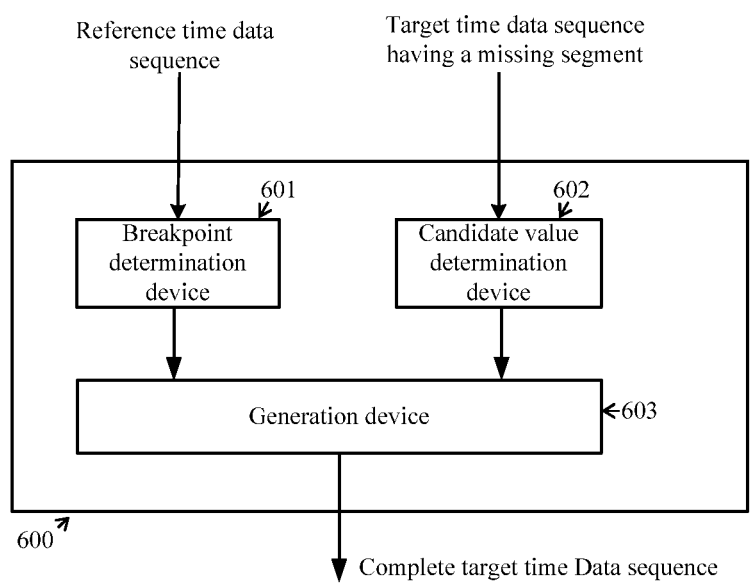
FIG. 6 illustrates a block diagram of an apparatus for generating data in a missing segment of a target time data sequence according to an embodiment of the present disclosure.

With reference now to FIG. 6, the apparatus for generating data in a missing segment of a target time data sequence according to the embodiment of the present disclosure will be described in detail. Because the apparatus and the method are based on the same inventive concept, the same or corresponding implementation details in the method are also applicable to the apparatus corresponding to the method described above, which will not be repeated herein since a detailed and complete description thereof has been provided above.

As shown in FIG. 6, the apparatus 600 for generating the data in the missing segment of the target time data sequence according to the embodiment of the present disclosure includes a breakpoint determination device 601, a candidate value determination device 602 and a generation device 603.

The breakpoint determination device 601 may determine whether there is a breakpoint in the missing segment of the target time data sequence. As described above, the breakpoint determination device 601 may determine whether there is the breakpoint in the missing segment of the target time data sequence, based on a reference time data sequence having a logical similarity to the target time data sequence. The reference time data sequence having the logical similarity to the target time data sequence refers to a time data sequence having a logic attribute which is identical or similar to that of the target time data sequence. The logic attribute may depend on a nature of the target time data sequence. Various logic attributes of the target time data sequence and time data sequences having logic attributes which are identical or similar to these logic attributes of the target time data sequence respectively may be stored in a memory (not shown) in advance, so that the reference time data sequence having the logical similarity to the target time data sequence may be read from the memory for use by the breakpoint determination device 601.

The breakpoint determination device 601 can determine whether there is the breakpoint in the missing segment by determining whether there is a breakpoint in a segment (i.e., reference segment), which corresponds to the missing segment of the target time data sequence, in the reference time data sequence. The reference segment may be, for example, a segment corresponding to a same period of time as the missing segment. As described above, the breakpoint determination device 601 may, for each datum (i.e., reference datum) in the reference segment, determine whether the at least one reference datum corresponds to the breakpoint according to a difference degree between average values of predetermined amounts of data located on both sides of the reference datum respectively in the reference time data sequence. If the difference degree is relatively large, it can be determined that the reference datum is the breakpoint, thereby determining that the corresponding datum (e.g., datum corresponding to same time as the reference datum) in the missing segment is also the breakpoint. Conversely, if the difference degree is relatively small, it can be determined that the reference datum is not the breakpoint, thereby determining that the corresponding datum in the missing segment is not the breakpoint, either.

The candidate value determination device 602 can determine candidates value of the data in the missing segment. Specifically, the candidate value determination device 602 may determine first candidate values of the data in the missing segment based on data located on a first side of (e.g., before or on a left side of) the missing segment in the target time data sequence, i.e., data of the first subsequence, and may determine second candidate values of the data in the missing segment based on data located on a second side of (e.g., after or on a right side of) the missing segment in the target time data sequence, i.e., data of the second subsequence. The candidate value determination device 602 may fit ARIMA models with respect to the first subsequence and the second subsequence respectively in the manner described above, and then determine the first candidate values and the second candidate values according the ARIMA models.

The generation device 603 may generate values of the data in the missing segment by selectively using the candidate values of the data in the missing segment according to whether there is the breakpoint in the missing segment.

Specifically, when there is no breakpoint in the missing segment, the generation device 603 can generate the data in the missing segment by using both the first candidate values and the second candidate values of the data in the missing segment. In the embodiment of the present disclosure, the data in the missing segment may be generated by using weighted sums of the first candidate values and the second candidate values respectively. On the other hand, if there is one breakpoint in the missing segment, the generation device 603 can determine the values of the data in the missing segment as corresponding values in the first candidate values or corresponding values in the second candidate values, according to positions of the data in the missing segment relative to the breakpoint. For example, the generation device 603 can use the breakpoint in the missing segment as a boundary, so as to determine the values of the data, which are located on a first side (e.g., a left side) of the breakpoint, in the missing segment as the corresponding values in the first candidate values, and determine the data, which are located on a second side (e.g., a right side) of the breakpoint, in the missing segment as the corresponding values in the second candidate value.

If there are a plurality of breakpoints in the missing segment, the generation device 603 may generate the data in the missing segment, which are located between a first datum $x_{n1+1}$ and a first breakpoint (a breakpoint closest to $x_{n1+1}$) in the missing segment in the manner described above, thereby update the missing segment into a new missing segment starting from the first breakpoint to $x_{n1+1}$, and then repeat the above operations on the new missing segment, until all the missing segments have been generated.

In this way, the value of the data in the missing segment of the target time data sequence may be generated more accurately with the above apparatus according to the embodiment of the present disclosure, so that various analyses based on the target time data sequence may obtain more accurate results.

With the method and the apparatus according to the above aspects of the present disclosure, for a time data sequence having a missing segment, data in the missing segment can be generated more accurately, so that an accurate result of an analysis on the time data sequence can be obtained.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating data in a missing segment of a target time data sequence of discrete data points, the method comprising:
    determining whether there is a breakpoint in the missing segment, wherein the determining is based on a reference time data sequence having a logical similarity to the target time data sequence, wherein the logical similarity is based on, at least, receiving time stamp data associated with the time data sequence and receiving user location data via a global positioning system (GPS) associated with the target time data sequence, and based on determining whether there is a breakpoint in a reference segment of the reference time data sequence, the reference segment corresponding to the missing segment;
    determining candidate values of the data in the missing segment, wherein determining the candidate values of the data in the missing segment includes:
        determining first candidate values of the data in the missing segment based on data on a first side of the missing segment in the target time data sequence; and
        determining second candidate values of the data in the missing segment based on data on a second side of the missing segment in the target time data sequence; and
    generating values of the data in the missing segment by selectively using the candidate values of the data in the missing segment, according to whether there is the breakpoint in the missing segment;
    wherein the breakpoint is a difference value, above a threshold, between a first reference data in the reference time data sequence and a second reference data in the reference time data sequence.

2. The method according to claim 1, wherein the determining whether there is the breakpoint in the reference segment, which corresponds to the missing segment, in the reference time data sequence includes:
    for at least one reference datum in the reference segment, determining whether the at least one reference datum corresponds to the breakpoint in the reference segment according to a difference degree between average values of predetermined amounts of data on both sides of the at least one reference datum respectively in the reference time data sequence.

3. The method according to claim 1, wherein the generating the values of the data in the missing segment by selectively using the candidate values of the data in the missing segment, according to whether there is the breakpoint in the missing segment includes:
    when there is no breakpoint in the missing segment, using weighted sums of the first candidate values and the second candidate values of the data in the missing segment as values of the data in the missing segment respectively.

4. The method according to claim 1, wherein the generating the values of the data in the missing segment by selectively using the candidate values of the data in the missing segment, according to whether there is the breakpoint in the missing segment includes:
    when there is the breakpoint in the missing segment, determining values of data, which are located on a first side of the breakpoint in the missing segment, as corresponding values in the first candidate values of the data in the missing segment, and determining values of data, which are located on a second side of the breakpoint in the missing segment, as corresponding values in the second candidate values of the data in the missing segment.

5. A computer program product for generating data in a missing segment of a target time data sequence of discrete data points, the computer program product comprising at least one computer readable non-transitory storage medium having computer readable program instructions thereon for execution by a processor, the computer readable program instructions comprising program instructions for:
    determining whether there is a breakpoint in the missing segment, wherein the determining is based on a reference time data sequence having a logical similarity to the target time data sequence, wherein the logical similarity is based on, at least, receiving time stamp data associated with the time data sequence and receiving user location data via a global positioning system (GPS) associated with the target time data sequence, and based on determining whether there is a breakpoint in a reference segment of the reference time data sequence, the reference segment corresponding to the missing segment;
    determining candidate values of the data in the missing segment, wherein the determining the candidate values of the data in the missing segment includes:
        determining first candidate values of the data in the missing segment based on data on a first side of the missing segment in the target time data sequence; and determining second candidate values of the data in the missing segment based on data on a second side of the missing segment in the target time data sequence; and generating values of the data in the missing segment by selectively using the candidate values of the data in the missing segment, according to whether there is the breakpoint in the missing segment;

wherein the breakpoint is a difference value, above a threshold, between a first reference data in the reference time data sequence and a second reference data in the reference time data sequence.

6. The computer program product according to claim 5, wherein the determining whether there is the breakpoint in the reference segment, which corresponds to the missing segment, in the reference time data sequence includes:

for at least one reference datum in the reference segment, determining whether the at least one reference datum corresponds to the breakpoint in the reference segment according to a difference degree between average values of predetermined amounts of data on both sides of the at least one reference datum respectively in the reference time data sequence.

7. The computer program product according to claim 5, wherein the generating the values of the data in the missing segment by selectively using the candidate values of the data in the missing segment, according to whether there is the breakpoint in the missing segment includes:

when there is no breakpoint in the missing segment, using weighted sums of the first candidate values and the second candidate values of the data in the missing segment as values of the data in the missing segment respectively.

8. A computer system for generating data in a missing segment of a target time data sequence of discrete data points, the computer system comprising:

one or more computer processors;

one or more computer-readable storage media;

program instructions stored on the computer-readable storage media for execution by at least one of the one or more processors, the program instructions comprising:

program instructions to determine whether there is a breakpoint in the missing segment, wherein the program instructions to determine are based on a reference time data sequence having a logical similarity to the target time data sequence, wherein the logical similarity is based on, at least, receiving time stamp data associated with the time data sequence and receiving user location data via a global positioning system (GPS) associated with the target time data sequence, and based on program instructions to determine whether there is a breakpoint in a reference segment of the reference time data sequence, the reference segment corresponding to the missing segment;

program instructions to determine candidate values of the data in the missing segment, wherein the program instructions to determine the candidate values of the data in the missing segment includes:

program instructions to determine first candidate values of the data in the missing segment based on data on a first side of the missing segment in the target time data sequence; and program instructions to determine second candidate values of the data in the missing segment based on data on a second side of the missing segment in the target time data sequence;

program instructions to generate values of the data in the missing segment by selectively using the candidate values of the data in the missing segment, according to whether there is the breakpoint in the missing segment;

wherein the breakpoint is a difference value, above a threshold, between a first reference data in the reference time data sequence and a second reference data in the reference time data sequence.

9. The computer system according to claim 8, wherein the determining whether there is the breakpoint in the reference segment, which corresponds to the missing segment, in the reference time data sequence includes:

for at least one reference datum in the reference segment, program instructions to determine whether the at least one reference datum corresponds to the breakpoint in the reference segment according to a difference degree between average values of predetermined amounts of data on both sides of the at least one reference datum respectively in the reference time data sequence.

10. The computer system according to claim 8, wherein the program instructions to generate the values of the data in the missing segment by selectively using the candidate values of the data in the missing segment, according to whether there is the breakpoint in the missing segment includes:

when there is no breakpoint in the missing segment, program instructions to use weighted sums of the first candidate values and the second candidate values of the data in the missing segment as values of the data in the missing segment respectively.

11. The computer system according to claim 8, wherein the program instructions to generate the values of the data in the missing segment by selectively using the candidate values of the data in the missing segment, according to whether there is the breakpoint in the missing segment includes:

when there is the breakpoint in the missing segment, program instructions to determine values of data, which are located on a first side of the breakpoint in the missing segment, as corresponding values in the first candidate values of the data in the missing segment, and program instructions to determine values of data, which are located on a second side of the breakpoint in the missing segment, as corresponding values in the second candidate values of the data in the missing segment.

* * * * *